(12) United States Patent
Hayashi

(10) Patent No.: US 11,782,660 B2
(45) Date of Patent: Oct. 10, 2023

(54) INFORMATION PROCESSING APPARATUS, INFORMATION PROCESSING METHOD, AND NON-TRANSITORY COMPUTER-READABLE STORAGE MEDIUM STORING AN INFORMATION PROCESSING PROGRAM

(71) Applicant: Seiko Epson Corporation, Tokyo (JP)

(72) Inventor: Ryotaro Hayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/657,809

(22) Filed: Apr. 4, 2022

(65) Prior Publication Data

US 2022/0317957 A1    Oct. 6, 2022

(30) Foreign Application Priority Data

Apr. 5, 2021    (JP) ................................ 2021-063973

(51) Int. Cl.
| | |
|---|---|
| *G06F 3/12* | (2006.01) |
| *B41J 3/28* | (2006.01) |
| *B41J 3/407* | (2006.01) |

(52) U.S. Cl.
CPC .............. *G06F 3/1256* (2013.01); *B41J 3/28* (2013.01); *B41J 3/40731* (2020.08); *G06F 3/1208* (2013.01); *G06F 3/1243* (2013.01)

(58) Field of Classification Search
CPC .... G06F 3/1256; G06F 3/1208; G06F 3/1243; B41J 3/40731; B41J 3/28
See application file for complete search history.

(56) References Cited

U.S. PATENT DOCUMENTS

| | | | | |
|---|---|---|---|---|
| 2011/0202624 | A1* | 8/2011 | Najm .................... | G06Q 30/02 709/207 |
| 2019/0364157 | A1* | 11/2019 | Ohta .................. | H04N 1/00915 |

FOREIGN PATENT DOCUMENTS

JP    2018-202837    12/2018

\* cited by examiner

*Primary Examiner* — Iriana Cruz
(74) *Attorney, Agent, or Firm* — WORKMAN NYDEGGER

(57) ABSTRACT

An information processing apparatus is configured to process information about a flatbed printer that prints an image on a medium held on a mounting table by a jig. The information processing apparatus includes an acquisition unit and a preview generation unit. The acquisition unit is configured to acquire a jig template indicating an image of the shape of the jig and print image data representing a print image to be printed on the medium. The preview generation unit is configured to generate, by using the jig template and the print image data, preview image data representing a preview image formed by superimposing the print image to be printed on the medium onto the image indicated by the jig template.

6 Claims, 9 Drawing Sheets

INFORMATION PROCESSING APPARATUS, INFORMATION PROCESSING METHOD, AND NON-TRANSITORY COMPUTER-READABLE STORAGE MEDIUM STORING AN INFORMATION PROCESSING PROGRAM

The present application is based on, and claims priority from JP Application Serial Number 2021-063973, filed Apr. 5, 2021, the disclosure of which is hereby incorporated by reference herein in its entirety.

BACKGROUND

1. Technical Field

The present disclosure relates to an information processing apparatus, an information processing method, and a non-transitory computer-readable storage medium storing an information processing program.

2. Related Art

Flatbed printers are known as printing devices for printing mainly on three-dimensional or thick mediums. The flatbed printers print images by using, for example, an ink jet method on mediums including relatively large mediums made of acryl or wood such as panels and signboards and relatively small mediums such as coasters in the state in which the mediums are mounted on a mounting table.

On the mounting table of the flatbed printer, a pre-cut medium is mounted at a print position. For positioning in the known flatbed printers, the print position is set by using, for example, software programs such as print applications. In particular, in the field of commercial printing, software programs such as raster image processor (RIP) software programs are utilized.

For example, JP-A-2018-202837 describes a technology of combining as a set of print data a plurality of data items of print images respectively corresponding to individual mediums with respect to setting of print position. In this technology, the layout of print images is set by specifying margins between the print images on an operational screen displayed on a display device of a computer or an operation panel of a flatbed printer.

To print on a three-dimensional medium such as a golf ball or a ballpoint pen, the flatbed printers use a jig to hold the three-dimensional medium. The jig has a hollow matching the shape of the medium. By fitting the medium into the hollow, the three-dimensional medium is held.

FIG. 7 illustrates an example of a setting screen of an RIP software program in the case of using a jig. To specify a print position for a medium mounted on a mounting table 50 and held by a jig 51 by using the RIP software program, it is necessary to designate the position of the medium instead of the position of the jig 51. With known positioning technologies, users of the RIP software program need to set on the RIP software program the positions of the hollows 52A to 52F calculated by individually adding the coordinates of positions C1 to C6 of the hollows 52A to 52F from the coordinates of a position J of the jig 51, to the coordinates of the position J from an origin O illustrated in FIG. 7. In this method, before printing, it is difficult to view the position at which a print image will be printed on the medium. Furthermore, because users of the RIP software program provide calculation for positioning, setting errors on the RIP software program may be caused.

SUMMARY

An information processing apparatus according to an aspect of the present disclosure is configured to process information about a flatbed printer that prints an image on a medium held on a mounting table by a jig. The information processing apparatus includes an acquisition unit and a preview generation unit. The acquisition unit is configured to acquire a jig template indicating an image of the shape of the jig and print image data representing a print image to be printed on the medium. The preview generation unit is configured to generate, by using the jig template and the print image data, preview image data representing a preview image formed by superimposing the print image to be printed on the medium onto the image indicated by the jig template.

An information processing method according to an aspect of the present disclosure is configured for processing information about a flatbed printer that prints an image on a medium held on a mounting table by a jig. The information processing method includes acquiring a jig template indicating an image of the shape of the jig and print image data representing a print image to be printed on the medium and generating, by using the jig template and the print image data, preview image data representing a preview image formed by superimposing the print image to be printed on the medium onto the image indicated by the jig template.

A non-transitory computer-readable storage medium stores an information processing program according to an aspect of the present disclosure. The information processing program is configured for processing information about a flatbed printer that prints an image on a medium held on a mounting table by a jig. The information processing program causes a computer to implement an acquisition function of acquiring a jig template indicating an image of the shape of the jig and print image data representing a print image to be printed on the medium and an image data generation function of generating, by using the jig template and the print image data, preview image data representing a preview image formed by superimposing the print image to be printed on the medium onto the image indicated by the jig template.

DESCRIPTION OF EXEMPLARY EMBODIMENTS

Figure 1:
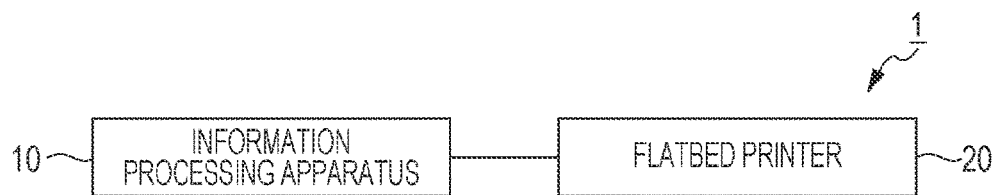
FIG. 1 is a block diagram illustrating a configuration of an information processing system according to an embodiment.

Hereinafter, an information processing apparatus, an information processing method, and an information processing program according to an embodiment will be described with reference to the drawings. In the drawings, the measurements and scale of individual elements may be different from the actual measurements and scale when appropriate. Because the embodiment described below is a preferred specific example, the embodiment includes various technically preferred limitations. The scope of the present disclosure is, however, not limited by the limitations unless the following description mentions that particular limitations limit the present disclosure.

1. Overall Configuration

FIG. 1 is a block diagram illustrating a configuration of an information processing system 1 according to the embodiment of the present disclosure. The information processing system 1 includes an information processing apparatus 10 and a flatbed printer 20. The information processing apparatus 10 and the flatbed printer 20 are coupled to each other in a communicable manner. The configuration illustrated in FIG. 1 is a mere example and should not be construed in a limiting sense. For example, a plurality of flatbed printers 20 may be coupled to one information processing apparatus 10 in a communicable manner.

The information processing system 1 is used to print images mainly on three-dimensional or thick mediums mounted on a mounting table 230 included in the flatbed printer 20. The mounting table 230 will be described later.

The information processing apparatus 10 processes information about the flatbed printer 20 that prints an image on a medium held on the mounting table 230 by a jig.

The flatbed printer 20 prints by an ink jet method on a print medium under the control of the information processing apparatus 10. The print medium is any medium suitable for printing by the ink jet method and may be, but not limited to, for example, various kinds of paper, cloth, or film. In the present embodiment, the print medium may be a three-dimensional or thick medium.

In the present embodiment, under the control of the information processing apparatus 10, the flatbed printer 20 prints an image on a medium held on the mounting table 230 by the jig.

2. Configuration of Information Processing Apparatus

Figure 2:
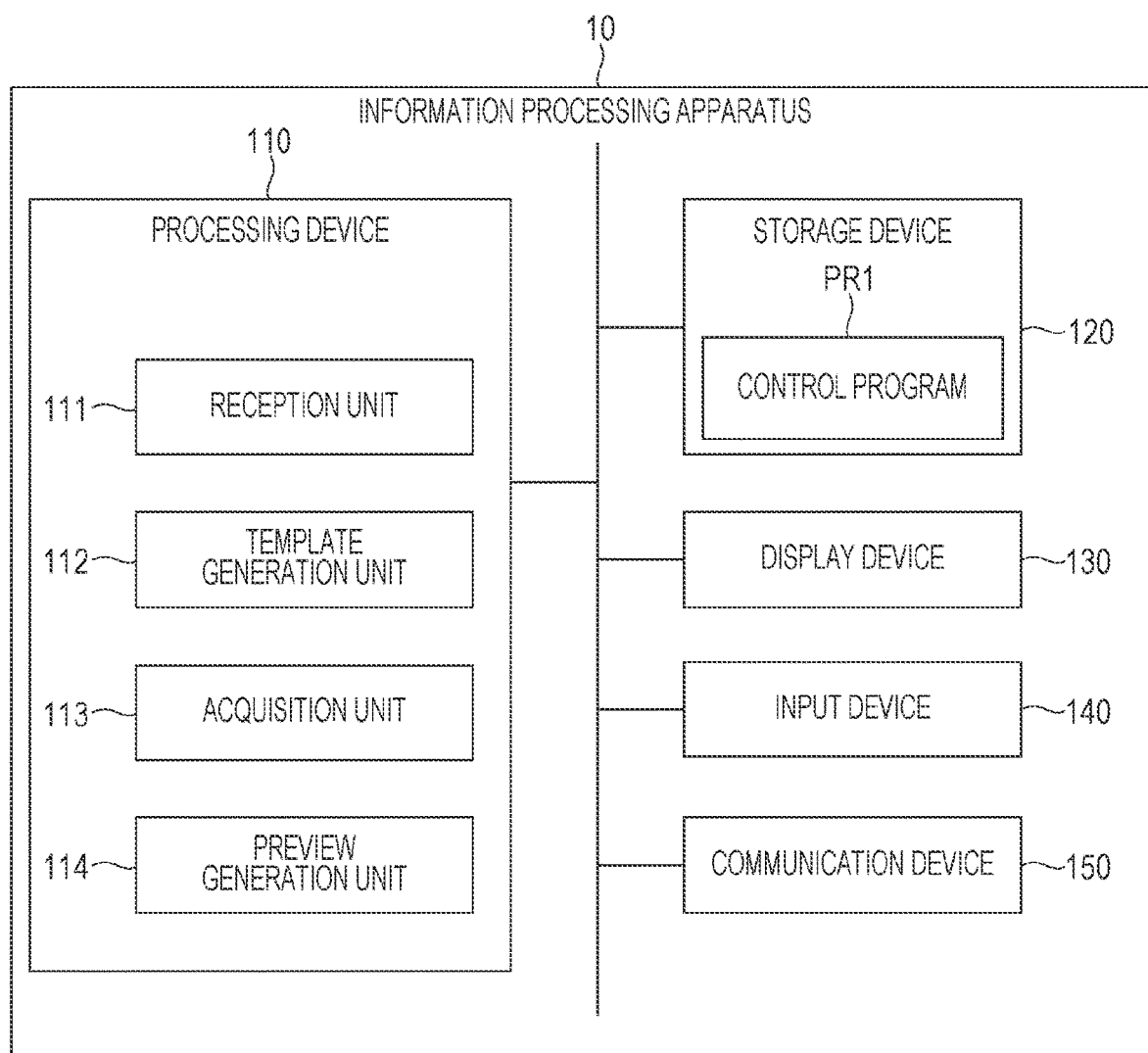
FIG. 2 is a block diagram illustrating a configuration of an information processing apparatus.

FIG. 2 is a block diagram illustrating a configuration example of the information processing apparatus 10. The information processing apparatus 10 may be typically, but not limited to, a personal computer (PC) but may be, for example, a tablet terminal or smartphone. The information processing apparatus 10 includes a processing device 110, a storage device 120, a display device 130, an input device 140, and a communication device 150. The elements of the information processing apparatus 10 are coupled to each other by one or more buses for communicating information.

The processing device 110 is a processor for controlling the entire information processing apparatus 10. The processing device 110 is formed by one or more chips. The processing device 110 is implemented by, for example, a central processing unit (CPU) including elements such as an interface for peripherals, an arithmetic unit, and a register. Part or all of the function of the processing device 110 may be implemented by a hardware device such as a digital signal processor (DSP), application-specific integrated circuit (ASIC), programmable logic device (PLD), or field-programmable gate array (FPGA). The processing device 110 performs different processing operations in a parallel or successive manner.

The storage device 120 is a recording medium readable by the processing device 110. The storage device 120 stores a plurality of programs including a control program PR1 run by the processing device 110 and a program for operating a raster image processor (RIP) mentioned above. The storage device 120 also stores a print image to be printed on a medium, an image of the outer shape of the jig, and a jig template representing an image of the shape of the jig. The jig template is generated by a template generation unit 112 described later. The storage device 120 may further store preview image data representing a preview image formed by superimposing a print image on an image of a jig template. The preview image data is generated by a preview generation unit 114 described later. The storage device 120 may be implemented by, for example, at least one of a read-only memory (ROM), an erasable programmable read-only memory (EPROM), an electrically erasable programmable read-only memory (EEPROM), and a random-access memory (RAM). The storage device 120 may also be referred to as, for example, a register, a cache, a main memory, or a primary storage device.

The display device 130 displays images and textual information. The display device 130 displays various kinds of images under the control of the processing device 110. Various kinds of display panels such as a liquid crystal display panel and an organic electroluminescent (EL) display panel may be used as the display device 130.

The input device 140 receives operations by a user. The input device 140 includes, for example, a keyboard, a touch pad, a touch panel, or a pointing device such as a mouse. When the input device 140 includes a touch panel, the input device 140 may also function as the display device 130.

The communication device 150 is a hardware device serving as a transceiver to communicate with other devices, especially with the flatbed printer 20. The communication device 150 is also referred to as, for example, a network device, a network controller, a network card, or a communication module.

The processing device 110 operates as a reception unit 111, the template generation unit 112, an acquisition unit 113, and the preview generation unit 114 by running the control program PR1 read from the storage device 120. The control program PR1 may be sent from another device such as a server managing the information processing apparatus 10 through a communication network.

The reception unit 111 receives information of the number of hollows of the jig. When the jig has a plurality of hollows, the reception unit 111 receives information about distances between the hollows. The reception unit 111 further receives information about the direction and distance to one hollow of one or more hollows from a given point in the jig. The reception unit 111 receives at least these kinds of information as reception information. The reception information can be received by acquiring, for example, information inputted by a user of the information processing system 1 by means of the input device 140. The operation of the reception unit 111 will be further described in detail later with reference to FIGS. 5A to 5D.

In this specification, the hollow holding a medium at the jig may be referred to as "holder".

The template generation unit 112 generates a jig template representing an image of the shape of the jig by using the reception information received by the reception unit 111. Specifically, the template generation unit 112 arranges one or more hollows according to the reception information on an image of the outer shape of the jig stored in the storage device 120 to generate a jig template. The template generation unit 112 stores the generated jig template in the storage device 120. The image of the outer shape of the jig may be generated by using information inputted by the user of the information processing system 1 by means of the input device 140.

The acquisition unit 113 acquires the jig template and print image data representing a print image to be printed on a medium. More specifically, the acquisition unit 113 acquires from the storage device 120 the jig template and print image data stored in the storage device 120. The embodiment of the present disclosure is, however, not limited to this example. For example, the acquisition unit 113 may acquire, instead of the template stored in the storage device 120, a jig template immediately after the jig template is generated by the template generation unit 112 without being stored in the storage device 120. Alternatively, the acquisition unit 113 may acquire, instead of the print image data stored in the storage device 120, print image data inputted by the user of the information processing system 1 by using the input device 140 without being stored in the storage device 120.

The preview generation unit 114 generates, by using the jig template and print image data acquired by the acquisition unit 113, preview image data representing a preview image formed by superimposing the print image to be printed on a medium onto the image of the jig template. The preview generation unit 114 accordingly causes the display device 130 to display the preview image based on the generated preview image data.

For example, when a print image is larger than a hollow in the jig, the preview generation unit 114 generates preview image data representing a preview image formed by superimposing a print image cropped to fit the shape of the hollow in the jig onto the hollow image in the image of the jig template. Conversely, when a print image is smaller than a hollow in the jig, the preview generation unit 114 generates preview image data representing a preview image formed by superimposing a print image moved to a desired position in the hollow by an operation of the user of the information processing system 1 onto the hollow image. The operation of the preview generation unit 114 will be further described in detail later with reference to FIGS. 5A to 5H.

3. Configuration of Flatbed Printer

Figure 3:
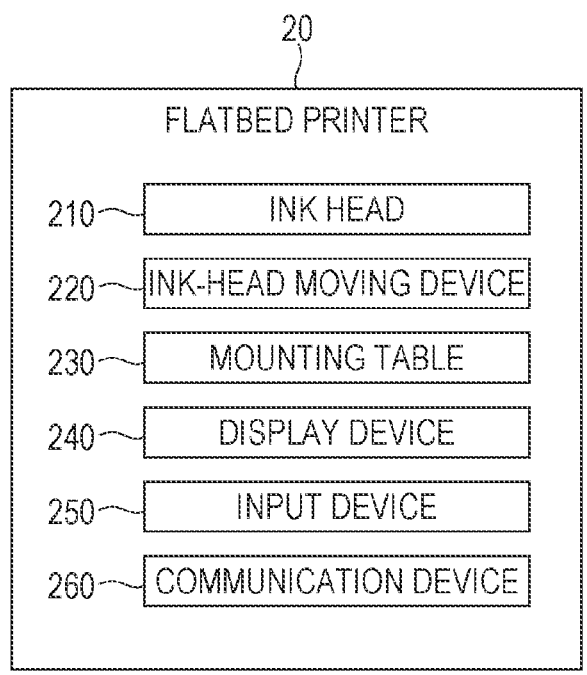
FIG. 3 is a block diagram illustrating a configuration of a flatbed printer.

FIG. 3 is a block diagram illustrating a configuration example of the flatbed printer 20. The flatbed printer 20 includes an ink head 210, an ink-head moving device 220, the mounting table 230, a display device 240, an input device 250, and a communication device 260.

The ink head 210 is a device that ejects ink onto a medium held on the mounting table 230 by the jig. The ink head 210 ejects onto a medium, under the control of the information processing apparatus 10, ink supplied from an ink cartridge, which is not illustrated in the drawing, from a plurality of nozzles, which are also not illustrated in the drawing. More specifically, the ink head 210 includes for the respective nozzles pressure chambers and drive elements, which are not illustrated in the drawing; the ink head 210 changes pressure in the pressure chambers by using the drive elements to eject ink in the pressure chambers from the nozzles. The drive elements may be, for example, piezoelectric elements or heating elements. The number of colors of ink ejected by the ink head 210 is not limited.

The ink-head moving device 220 is a mechanism for moving the ink head 210 relative to the mounting table 230. In the present embodiment, the ink-head moving device 220 moves the ink head 210 in main and sub scanning directions that are parallel to the mounting table 230. In the flatbed printer 20, ink is ejected while the ink head 210 is moved, and as a result, an image is formed on a printing surface of a medium as a print medium.

The mounting table 230 is a table for mounting a medium as a print medium. The mounting table 230 is positioned under the ink head 210.

The display device 240 displays images and textual information. The display device 240 displays various kinds of images under the control of a processing device not illustrated in the drawing. Various kinds of display panels such as a liquid crystal display panel and an organic EL display panel may be used as the display device 240.

The input device 250 receives operations by a user. The input device 250 includes, for example, a touch pad, a touch panel, or a pointing device such as a mouse. When the input device 250 includes a touch panel, the input device 250 may also function as the display device 240.

The communication device 260 is a hardware device serving as a transceiver to communicate with other devices, especially with the information processing apparatus 10. The communication device 260 is also referred to as, for example, a network device, a network controller, a network card, or a communication module.

4. Operation of Information Processing System 1

Figure 4A:
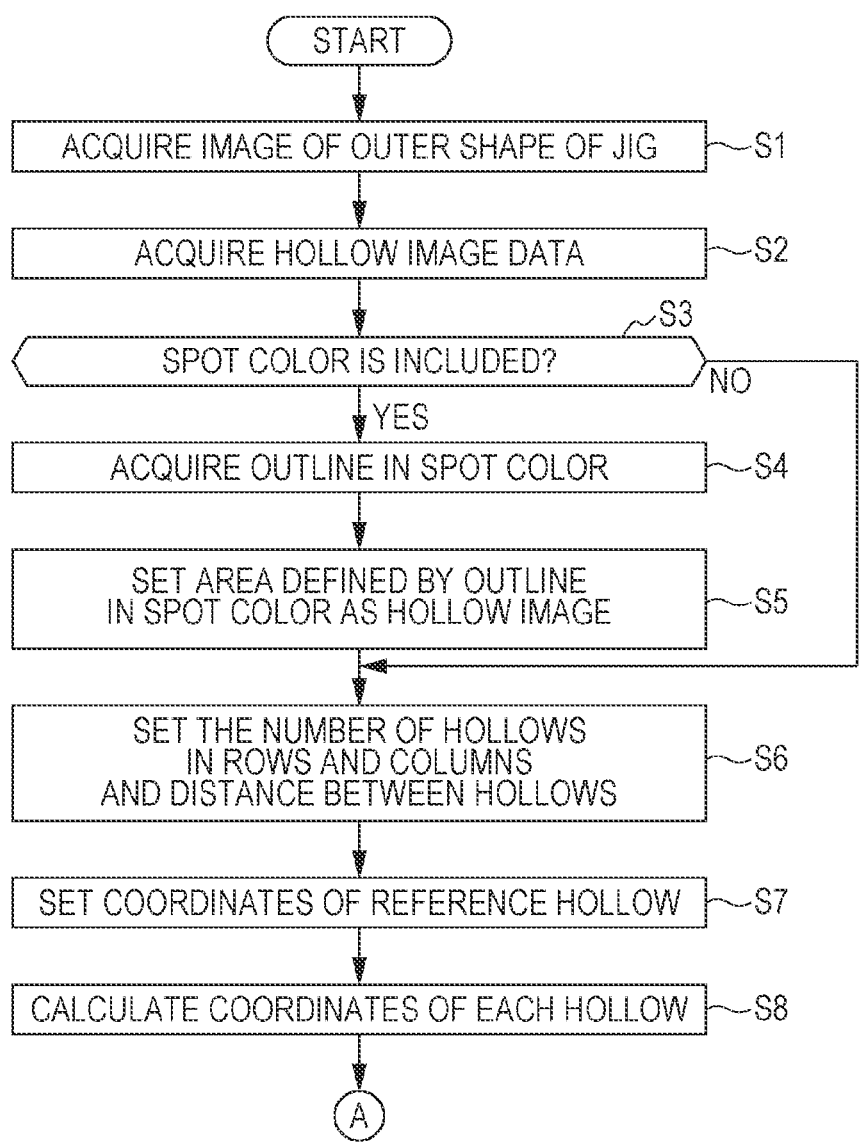
FIG. 4A is a flowchart illustrating an example of an operation of the information processing system.
Figure 4B:
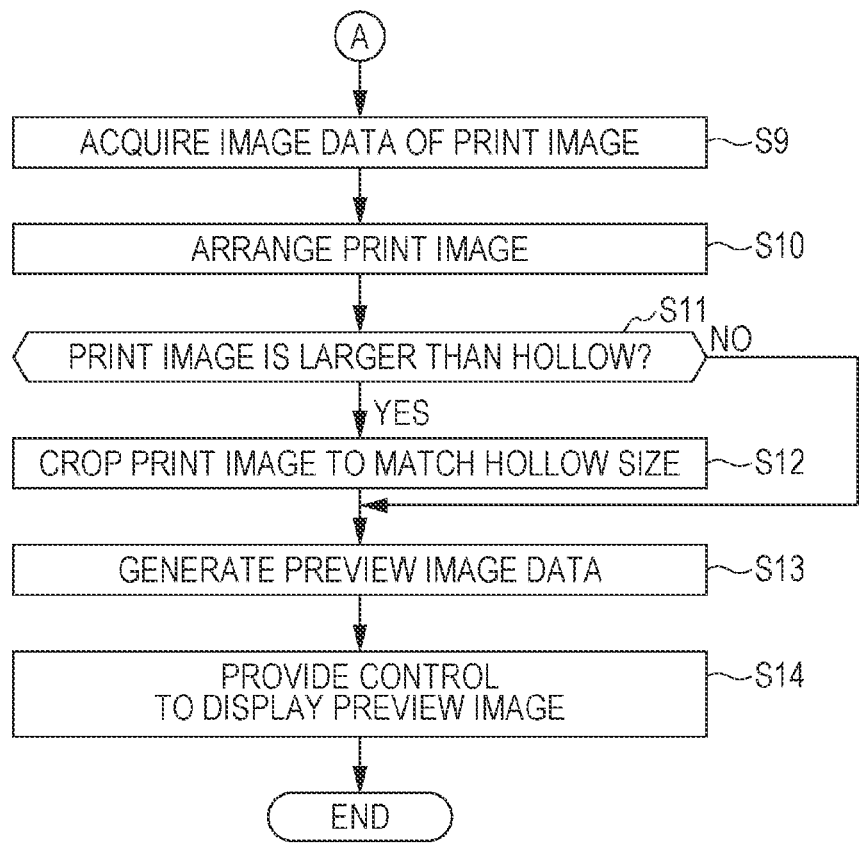
FIG. 4B is a flowchart illustrating an example of the operation of the information processing system.
Figure 5A:
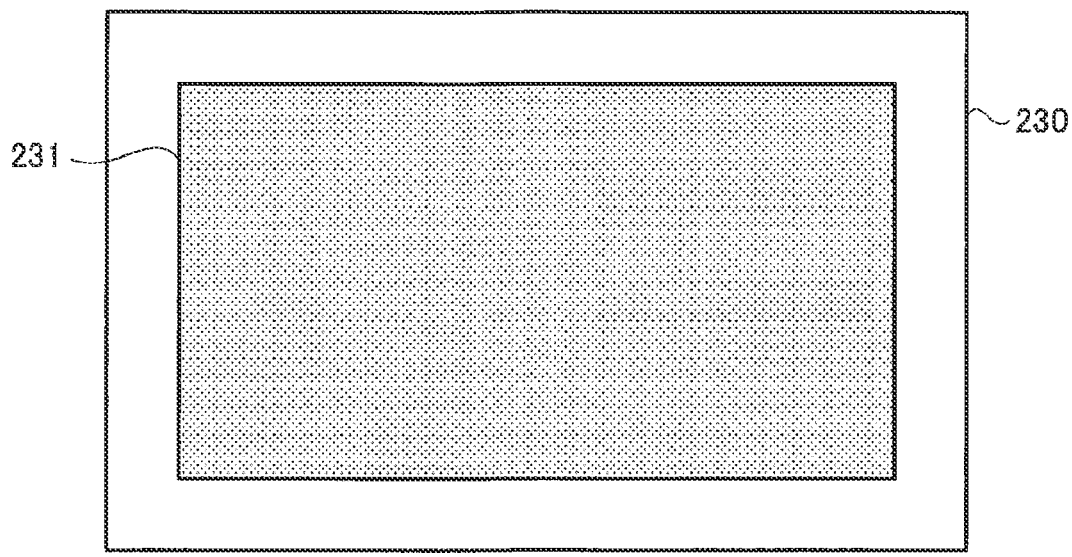
FIG. 5A illustrates an example of a screen displayed on a display device in the case of an example of the operation of the information processing system.
Figure 5B:
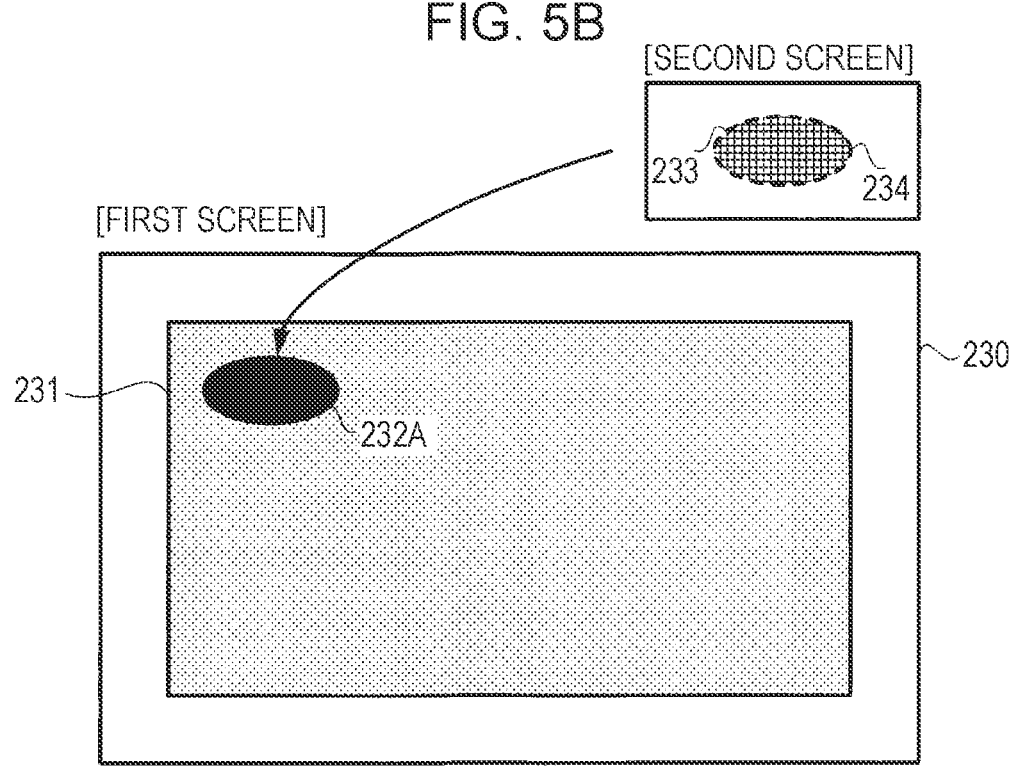
FIG. 5B illustrates an example of screens displayed on the display device in the case of an example of the operation of the information processing system.
Figure 5C:
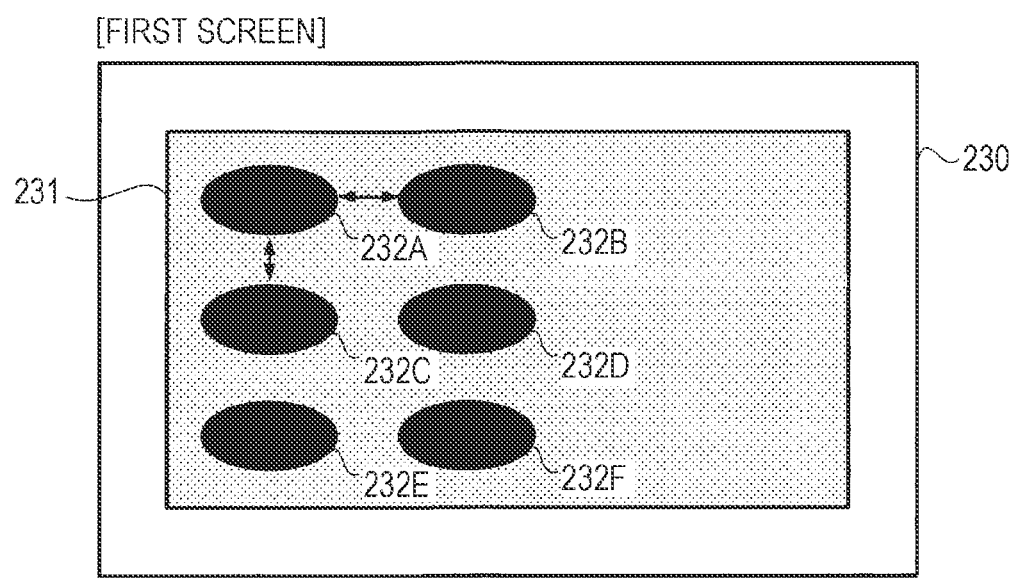
FIG. 5C illustrates an example of a screen displayed on the display device in the case of an example of the operation of the information processing system.
Figure 5D:
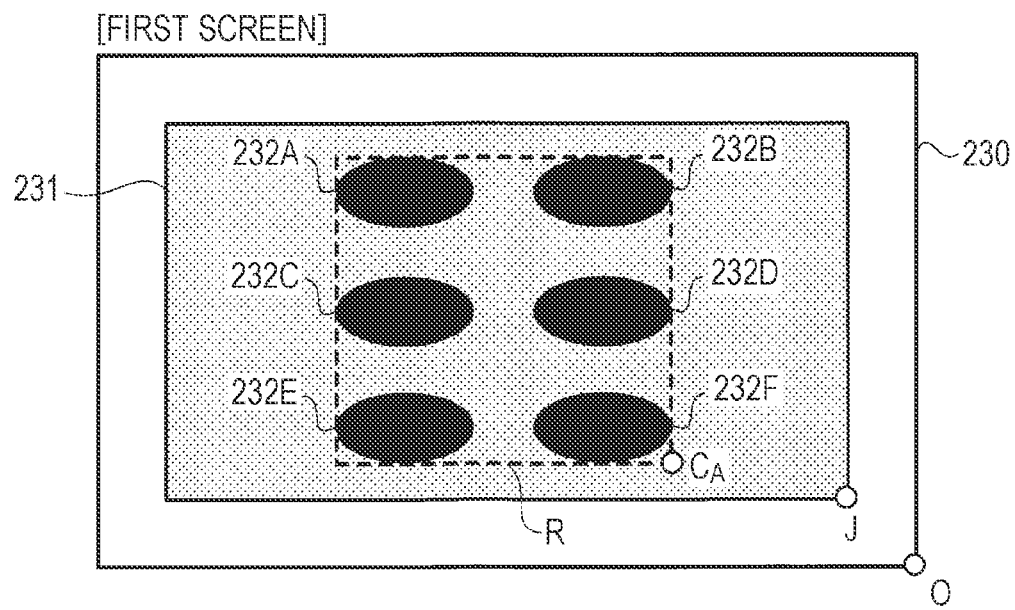
FIG. 5D illustrates an example of a screen displayed on the display device in the case of an example of the operation of the information processing system.

Next, an operation of the information processing system 1 will be described with reference to FIGS. 4A, 4B, 5A, 5H, and 6. FIGS. 4A and 4B provides a flowchart illustrating an example of the operation of the information processing system 1. FIGS. 5A to 5H illustrate examples of screens displayed on the display device 130 in the case of the example of the operation of the information processing system 1. FIG. 6 illustrates an appearance of a hollow image in the case of the example of the operation of the information processing system 1.

Firstly, the acquisition unit 113 acquires an image of the outer shape of a jig (S1). More specifically, the acquisition unit 113 may acquire an image of the outer shape of a jig stored in the storage device 120. Alternatively, the acquisition unit 113 may generate an image of the outer shape of the jig in accordance with information inputted by the user of the information processing system 1 by means of the input device 140 such as information about the width and height of a jig. As illustrated in FIG. 5A, a first screen on the display device 130 accordingly displays an image indicating that a jig 231 is mounted at the center of the mounting table 230. Instead of the acquisition unit 113, the template generation unit 112 may acquire an image of the outer shape of a jig. An image of the outer shape of a jig may be displayed at any position in an image of the mounting table 230 in accordance with an operation of the user of the information processing system 1.

Next, the acquisition unit 113 acquires hollow image data (S2). As illustrated in FIG. 5B, a second screen on the display device 130 accordingly displays a hollow image 233 of a hollow. Instead of the acquisition unit 113, the template generation unit 112 may acquire hollow image data.

When the hollow image represented by the hollow image data includes a spot color (YES in S3), the acquisition unit 113 acquires the outline in the spot color (S4). When the hollow image does not include a spot color (NO in S3), the process moves to S6 described later. The "spot color" denotes a color for indicating the outline of a hollow; the color is different from colors used in a hollow image. In FIG. 5B, a dotted line indicates an outline 234 actually indicated by the spot color. Instead of the acquisition unit 113, the template generation unit 112 may acquire the outline in the spot color.

After the outline in the spot color is acquired, the template generation unit 112 sets as a hollow image an area defined by the outline in the spot color (S5). In FIG. 5B, the area defined by the outline 234 in the spot color in the second screen displayed on the display device 130 is set as a hollow image 232A in the first screen displayed on the display device 130.

When the outline of an image represented by hollow image data can be determined as the outline of a hollow, the operations in S3 to S5 can be omitted. However, as illustrated in FIG. 6, when an image represented by hollow image data includes, for example, large or small dots, each large or small dot may be misrecognized as a hollow. For this case, as illustrated in FIG. 6, by coloring the outline 234 with the spot color, the possibility of misrecognition can be reduced.

After the hollow image is set, the template generation unit 112 sets the number of hollows in rows and columns and the distance between hollows (S6). More specifically, in accordance with the reception information, which is received by the reception unit 111, including the number of hollows in rows and columns, and when a plurality of hollows exist, including the distance between hollows, the template generation unit 112 sets the number of hollows in rows and columns and the distance between hollows. In the example illustrated in FIG. 5C, the first screen on the display device 130 displays in the jig 231 six hollow images 232A to 232F in three rows and two columns.

Next, the template generation unit 112 sets coordinates of a reference hollow (S7). More specifically, as illustrated in FIG. 5D, the template generation unit 112 circumscribes a rectangle R around the hollow images 232A to 232F. The template generation unit 112 then determines as a reference hollow image the hollow image 232F that is the closest hollow image of the hollow images 232A to 232F inscribed in the rectangle R to an origin J of the jig 231. The template generation unit 112 further determines as a reference hollow origin a vertex $C_A$ that is the closest point of four vertices of the rectangle R to the origin of the jig 231. The template generation unit 112 further determines coordinates of the vertex $C_A$ as reference hollow coordinates. The rectangle R, the origin O of the mounting table 230, the origin J of the jig 231, and the vertex $C_A$ determining the reference hollow coordinates may be indicated or not indicated in the first screen displayed on the display device 130.

Next, the template generation unit 112 calculates coordinates of each hollow by using the number of hollows in rows and columns and the distance between hollows, which are set in S6, and the reference hollow coordinates, which is set in S7 (S8). The coordinates of each hollow are the coordinates of a closest vertex of four vertices of a rectangle circumscribed around the hollow to the origin of the jig 231.

By performing these operations in S1 to S8, a jig template is generated. When a jig template previously stored in the storage device 120 is used without generating a new jig template, the operation in which the acquisition unit 113 acquires the jig template stored in the storage device 120 may be performed instead of the operations in S1 to S8.

Next, the acquisition unit 113 acquires a print image stored in the storage device 120 (S9). The preview generation unit 114 arranges the acquired print image at a hollow in a display screen on the display device 130 by following the operation performed by the user of the information processing system 1 by means of the input device 140 (S10). In an example in FIG. 5E, the second screen of the display device 130 displays a print image 235. By operating, for example, a mouse, the user of the information processing system 1 moves an object included in the print image 235, specifically, an alphabet letter "A" in the example in FIG. 5E to a desired position within an outline 236A of a hollow.

Figure 5E:
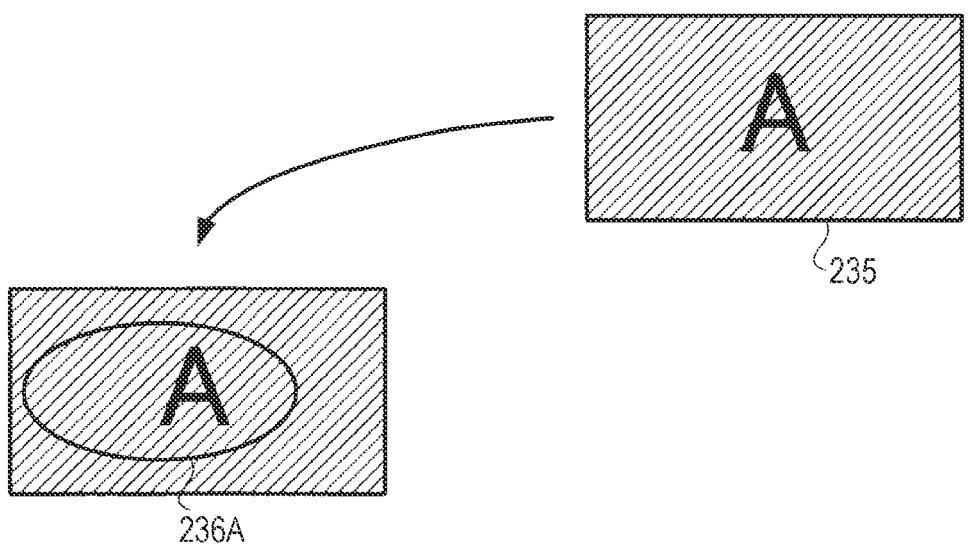
FIG. 5E illustrates an example of a screen displayed on the display device in the case of an example of the operation of the information processing system.
Figure 6:
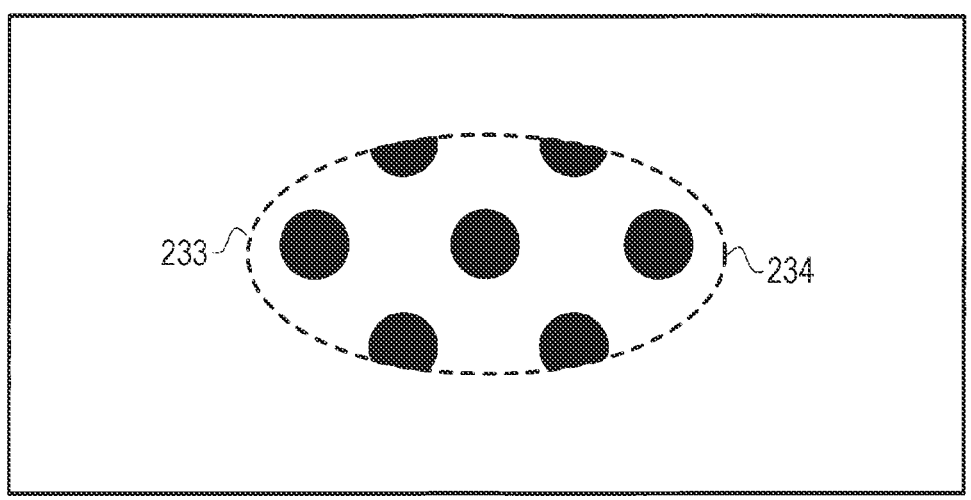
FIG. 6 illustrates an appearance of a hollow image in the case of an example of the operation of the information processing system.
Figure 7:
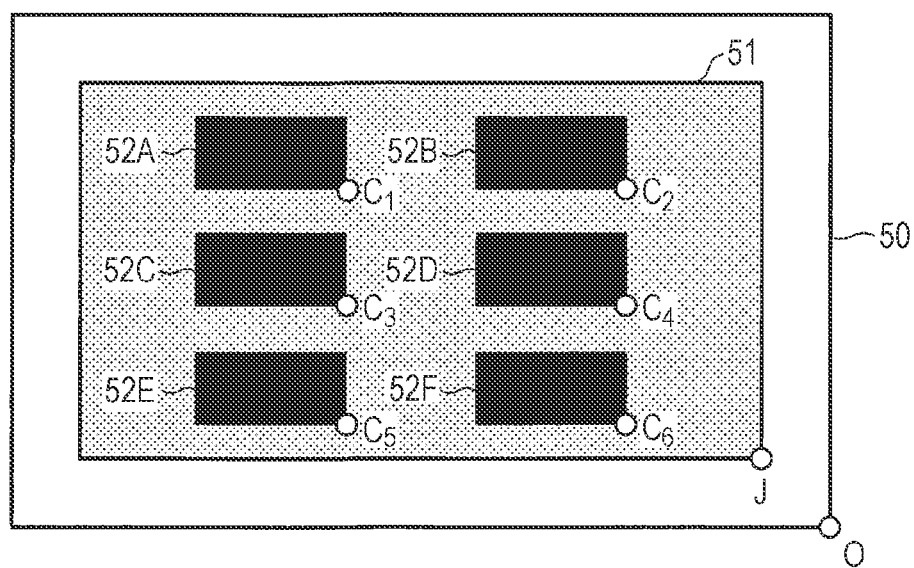
FIG. 7 illustrates an example of a setting screen of an RIP software program in related art.

As illustrated in FIG. 5E, when the print image 235 is larger than the size of the hollow, that is, the size of the outline 236A of the hollow (YES in S11), the preview generation unit 114 crops the print image 235 at the outline 236A of the hollow (S12) and accordingly generates preview image data representing a preview image (S13). When the print image 235 is identical to or smaller than the size of the outline 236A of the hollow (NO in S11), the preview generation unit 114 skips the operation in S12 and generates preview image data representing a preview image (S13).

Figure 5F:
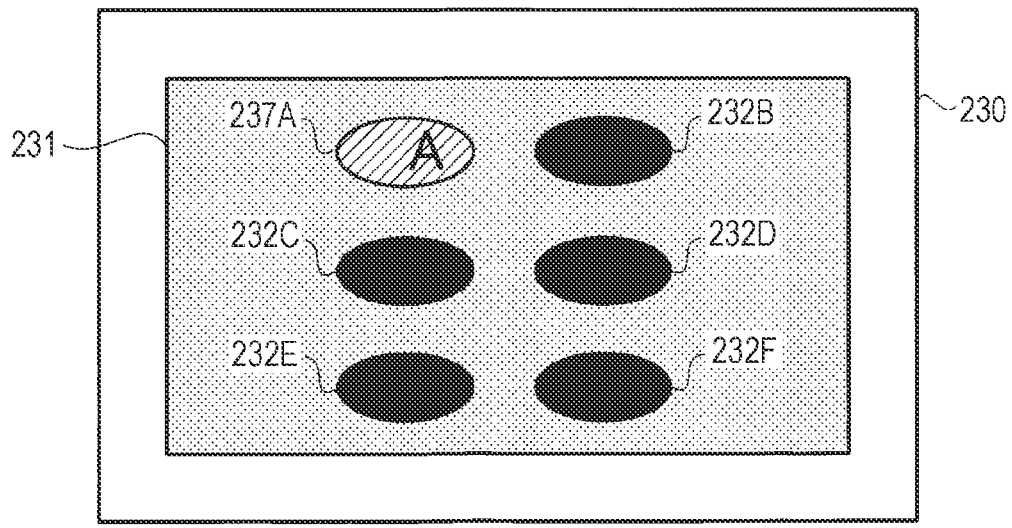
FIG. 5F illustrates an example of a screen displayed on the display device in the case of an example of the operation of the information processing system.
Figure 5G:
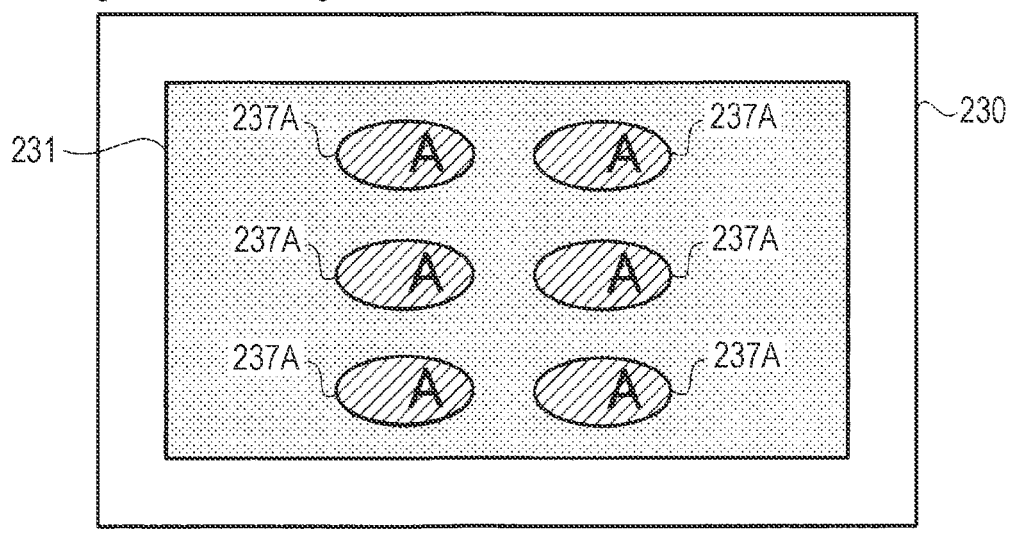
FIG. 5G illustrates an example of a screen displayed on the display device in the case of an example of the operation of the information processing system.
Figure 5H:
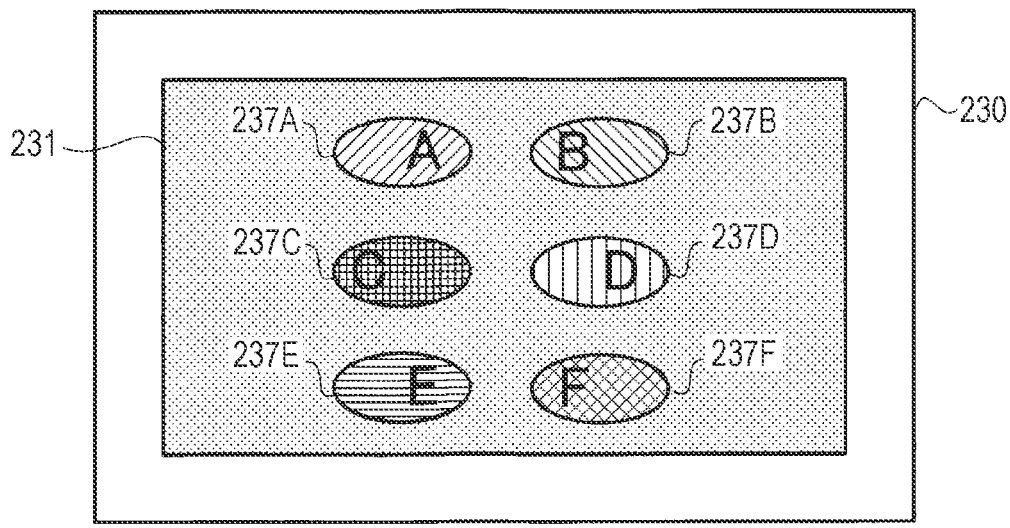
FIG. 5H illustrates an example of a screen displayed on the display device in the case of an example of the operation of the information processing system.

Finally, the preview generation unit 114 causes the display device 130 to display the preview image based on the generated preview image data (S14). FIG. 5F illustrates an example of a preview image displayed by the first screen of the display device 130. As illustrated in FIG. 5F, a print image 237A to be printed on a medium held by the hollow is displayed at the position at which the hollow image 232A is displayed in FIG. 5D. The appearance of the preview image is not limited to this example. For example, after the operations in S9 to S12 are performed successively only one time, the preview generation unit 114 may cause the display device 130 to display a preview image indicating that the print image 237A is to be printed on all mediums held by hollows, as illustrated in FIG. 5G. Alternatively, after the operations in S9 to S12 are performed repeatedly the number of times equal to the number of hollows, the preview generation unit 114 may cause the display device 130 to display a preview image indicating that different print images 237A to 237F are to be printed on the respective mediums held by the hollows, as illustrated in FIG. 5H.

The display screen illustrated as examples in FIGS. 5A to 5H may be implemented by a user interface (UI) of the RIP software program installed in the information processing apparatus 10.

5. Effects Achieved by Information Processing System 1

As described above, the present embodiment provides the information processing apparatus 10 configured to process information about the flatbed printer 20 that prints an image on a medium held on the mounting table 230 by the jig. The information processing apparatus 10 includes the acquisition unit 113 and the preview generation unit 114. The acquisition unit 113 is configured to acquire a jig template indicating an image of the shape of the jig and print image data representing a print image to be printed on the medium. The preview generation unit 114 is configured to generate, by using the jig template and the print image data, preview image data representing a preview image formed by superimposing the print image to be printed on the medium onto the image indicated by the jig template.

The information processing apparatus 10 uses a jig template to match the position of a print image to the position of a medium on the flatbed printer 20, and as a result, it is possible to easily generate preview image data representing a preview image indicating that the print image is to be printed on the medium. Furthermore, by using this preview image, the user of the information processing apparatus 10 can easily match the position of a print image to the position of a medium held on the mounting table 230 by the jig in the flatbed printer 20.

According to the present embodiment, the information processing apparatus 10 may further include the display device 130 configured to display the preview image.

The information processing apparatus 10 causes the display device 130 to display a preview image, and accordingly, it is possible to check the printed appearance before a print image is actually printed on a medium.

According to the present embodiment, the jig may include one or more holders configured to hold the medium. The image indicated by the jig template may include the one or more holders. The preview image may be formed by superimposing the print image onto an image of one holder, images of some holders, or images of all holders of the one or more holders.

As a result, the jig template can include images of holders for holding mediums.

According to the present embodiment, the information processing apparatus 10 may further include the reception unit 111 configured to receive reception information including a count of the one or more holders, a distance between the holders when the one or more holders include a plurality of holders, and the direction and distance to one holder of the one or more holders from a given point in the jig and the template generation unit 112 configured to generate the jig template in accordance with the reception information.

As such, it is possible to generate a new jig template in accordance with, for example, the reception information inputted by using the input device 140.

6. Modifications

The present disclosure is not limited to the embodiment described above. For example, as the holder for holding a medium, a bump may be provided in the jig instead of the hollow. By providing a bump in the jig, the jig can hold a medium having a depressed portion, such as a compact disc (CD) or digital versatile disc (DVD). Moreover, a jig template indicating the shape of the jig including the bump may be used.

What is claimed is:

1. An information processing apparatus configured to process information about a flatbed printer that prints an image on a medium held on a mounting table by a jig, the information processing apparatus comprising:

a processor instantiating an acquisition unit configured to acquire a jig template indicating an image of a shape of the jig, the jig template including holder information for one or more holders that are shaped in a shape of the medium to be printed on, the holder information defining a boundary where the medium will be placed in the jig when the printing is performed, and print image data representing a print image to be printed on the medium; and the processor instantiating a preview generation unit configured to generate, by using the jig template and the print image data, preview image data representing a preview image formed by superimposing the print image to be printed on the medium onto the image indicated by the jig template, the print image being superimposed inside the boundary defined by the holder information.

2. The information processing apparatus according to claim 1, further comprising:

a display device configured to display the preview image in accordance with the preview image data.

3. The information processing apparatus according to claim 1, further comprising:

the processor instantiating a reception unit configured to receive reception information including a count of the one or more holders, a distance between the holders when the one or more holders include a plurality of holders, and a direction and a distance to one holder of the one or more holders from a given point in the jig; and the processor instantiating a template generation unit configured to generate the jig template in accordance with the reception information.

4. The information processing apparatus according to claim 1, wherein a holder is a hollow or a bump in the jig.

5. An information processing method for processing information about a flatbed printer that prints an image on a medium held on a mounting table by a jig, the information processing method comprising:

acquiring a jig template indicating an image of a shape of the jig, the jig template including holder information for one or more holders that are shaped in a shape of the medium to be printed on, the holder information defining a boundary where the medium will be placed in the jig when the printing is performed, and print image data representing a print image to be printed on the medium; and generating, by using the jig template and the print image data, preview image data representing a preview image formed by superimposing the print image to be printed on the medium onto the image indicated by the jig template, the print image being superimposed inside the boundary defined by the holder information.

6. A non-transitory computer-readable storage medium storing an information processing program for processing information about a flatbed printer that prints an image on a medium held on a mounting table by a jig, the information processing program causing a computer to implement:

an acquisition function of acquiring a jig template indicating an image of a shape of the jig the jig template including holder information for one or more holders that are shaped in a shape of the medium to be printed on, the holder information defining a boundary where the medium will be placed in the jig when the printing is performed, and print image data representing a print image to be printed on the medium; and an image data generation function of generating, by using the jig template and the print image data, preview image data representing a preview image formed by superimposing the print image to be printed on the medium onto the image indicated by the jig template, the print image being superimposed inside the boundary defined by the holder information.

\* \* \* \* \*